(12) United States Patent
Smith et al.

(10) Patent No.: US 10,205,712 B2
(45) Date of Patent: Feb. 12, 2019

(54) SENTINEL APPLIANCE IN AN INTERNET OF THINGS REALM

(71) Applicant: McAfee, LLC, Plano, TX (US)

(72) Inventors: Ned M. Smith, Beaverton, OR (US); Simon Hunt, Naples, FL (US); Venkata Ramanan Sambandam, Sunnyvale, CA (US)

(73) Assignee: McAfee, LLC, Santa Clara, CA (US)

( * ) Notice: Subject to any disclaimer, the term of this patent is extended or adjusted under 35 U.S.C. 154(b) by 338 days.

(21) Appl. No.: 14/866,203

(22) Filed: Sep. 25, 2015

(65) Prior Publication Data

US 2017/0063815 A1 Mar. 2, 2017

Related U.S. Application Data

(60) Provisional application No. 62/173,857, filed on Jun. 10, 2015.

(51) Int. Cl.
| | | |
|---|---|---|
| *H04L 29/06* | (2006.01) | |
| *H04L 9/08* | (2006.01) | |
| *H04L 9/32* | (2006.01) | |

(52) U.S. Cl.
CPC ......... *H04L 63/061* (2013.01); *H04L 9/0844* (2013.01); *H04L 9/3234* (2013.01); *H04L 9/3263* (2013.01); *H04L 63/02* (2013.01); *H04L 63/0428* (2013.01); *H04L 63/10* (2013.01); *H04L 63/1425* (2013.01); *H04L 63/1441* (2013.01); *H04L 63/20* (2013.01)

(58) Field of Classification Search
CPC ....... H04L 63/10; H04L 63/08; H04L 63/102; H04W 12/06; H04W 12/08
USPC .............................................................. 726/4
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,460,050 B1 | 10/2002 | Pace et al. |
| 7,506,155 B1 | 3/2009 | Stewart et al. |
| 2006/0206708 A1* | 9/2006 | Son ........................ H04H 60/15 713/163 |

(Continued)

FOREIGN PATENT DOCUMENTS

| | | |
|---|---|---|
| WO | 2014165747 A1 | 10/2014 |
| WO | 2014194858 A1 | 12/2014 |

(Continued)

OTHER PUBLICATIONS

International Search Report and Written Opinion in International Application No. PCT/US2016/031565 dated Aug. 8, 2016.

*Primary Examiner* — William S Powers
(74) *Attorney, Agent, or Firm* — Patent Capital Group

(57) ABSTRACT

In an example, there is disclosed a computing apparatus, comprising: a trusted execution environment (TEE); and a security engine operable to: identify a key negotiation for an encrypted connection between a first device and a second device; request a service appliance key for the key negotiation; receive the service appliance key; and perform a service appliance function on traffic between the first device and the second device. There is also disclosed a method of providing the security engine, and a computer-readable medium having stored thereon executable instructions for providing the security engine.

25 Claims, 8 Drawing Sheets

(56) References Cited

U.S. PATENT DOCUMENTS

| | | | |
|---|---|---|---|
| 2007/0154016 A1 | 7/2007 | Nakhjiri et al. | |
| 2009/0220080 A1 | 9/2009 | Herne et al. | |
| 2012/0304310 A1 | 11/2012 | Blaisdell | |
| 2013/0191627 A1 | 7/2013 | Ylonen et al. | |
| 2015/0067762 A1* | 3/2015 | Belenky | H04L 63/20 726/1 |
| 2015/0113264 A1 | 4/2015 | Wang et al. | |
| 2015/0229654 A1* | 8/2015 | Perier | H04W 12/06 726/3 |
| 2015/0278531 A1* | 10/2015 | Smith | G06F 21/6218 713/165 |
| 2015/0347114 A1* | 12/2015 | Yoon | G06F 8/61 235/375 |
| 2016/0147506 A1* | 5/2016 | Britt | G06F 8/36 717/107 |
| 2016/0173495 A1* | 6/2016 | Joo | H04L 63/08 713/171 |
| 2016/0182531 A1* | 6/2016 | Rubakha | H04L 63/123 726/1 |
| 2016/0197786 A1* | 7/2016 | Britt | H04W 4/70 370/255 |
| 2016/0292938 A1* | 10/2016 | Zakaria | G07C 9/00571 |

FOREIGN PATENT DOCUMENTS

| | | |
|---|---|---|
| WO | 2014209322 A1 | 12/2014 |
| WO | 2016200526 A1 | 12/2016 |

* cited by examiner

SENTINEL APPLIANCE IN AN INTERNET OF THINGS REALM

CROSS REFERENCE TO RELATED APPLICATIONS

This application claims priority to U.S. Provisional Application 62/173,857, titled "Internet of Things Device Security Inspection," filed Jun. 10, 2015, which is incorporated herein by reference.

FIELD OF THE SPECIFICATION

This disclosure relates in general to the field of computer security, and more particularly, though not exclusively to, a system and method for providing a sentinel appliance in an internet-of-things realm.

BACKGROUND

The Internet of Things (IoT) is a loosely-defined network of physical objects (things) with embedded computing and communication capabilities, thus allowing the "things" to exchange data with one another. Within the IoT, real world phenomena can be sensed or observed electronically, and outputs from sensors or other data sources may be used as an input to a control system. In some cases, this allows a tighter coupling between the physical world and the virtual space. Each "thing" in the IoT may be uniquely identified with its physical computing platform, and some things are configured to operate within the existing internet infrastructure. Other devices operate over other network topologies, including ad hoc networks and direct data connections among others. In general terms, the IoT is considered to be a highly-democratic (sometimes even anarchic) network in which individual devices and networks may have broad autonomy in terms of what they do, how they do it, and how they communicate about it.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
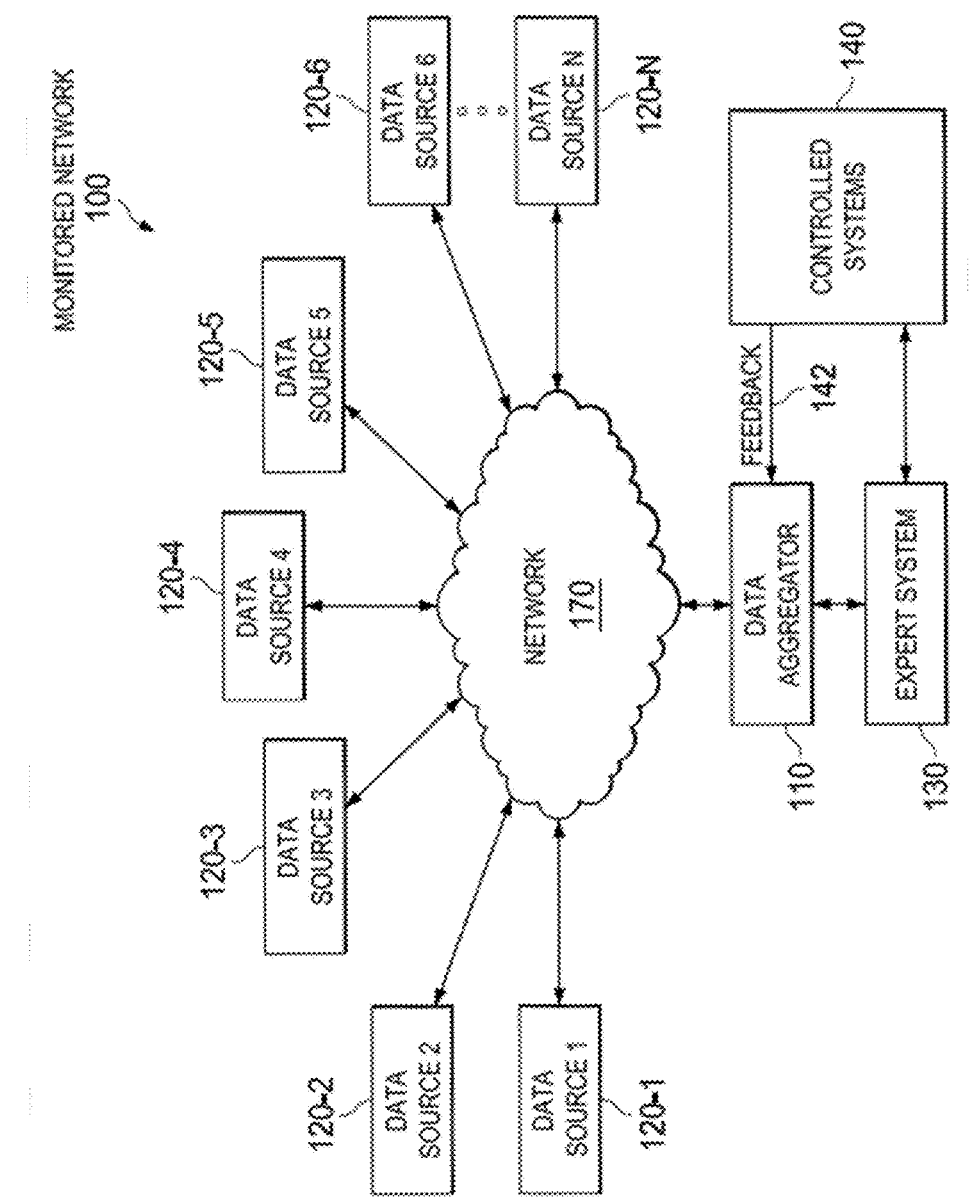
FIG. 1 is a block diagram of a monitored network, which may be or comprise an IoT realm or domain, according to one or more examples of the present specification.

In an example, there is disclosed a computing apparatus, comprising: a trusted execution environment (TEE); and a security engine operable to: identify a key negotiation for an encrypted connection between a first device and a second device; request a service appliance key for the key negotiation; receive the service appliance key; and perform a service appliance function on traffic between the first device and the second device. There is also disclosed a method of providing the security engine, and a computer-readable medium having stored thereon executable instructions for providing the security engine.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The "Internet of Things" (IoT) is an explosive global aggregation of heterogeneous "smart" and "network-enabled" devices that often each provide a single, specialized function. The IoT includes smart appliances, smart sensors, smart phones, and a plethora of other devices to which "smart" can be (and often is) prepended.

Because the IoT is not a traditional network, it presents challenges that are sometimes new and unique. For example, in traditional networking, an oligarchy of naming authorities parcel out a relative handful of globally-unique internet protocol (IP) addresses, as in the IPv4 space, which has a theoretical maximum of approximately 4.3 billion unique addresses. This made global IPv4 addresses a relatively dear commodity to be managed centrally by an administrative body. But the cascade of IoT devices makes such a scheme both impractical and undesirable for many. Rather, IoT devices may operate within defined subnetworks using network address translation (NAT), or may self-declare a "Universally Unique Identifier" (UUID), which in one example is a 128-bit integer, and which may be usable as an IPv6 IP address. Such autonomous naming presents both new opportunities and new challenges that users and enterprises are still working to understand and appreciate. In one sense, the IoT may be viewed as a new, wild frontier, where rules are still evolving and where any device can be practically anything that it wants to be. While this provides exciting opportunities for innovators to experiment and try new things, it also provides a sometimes-lawless frontier where devices and their designers may not always be able to rely on traditional security solutions.

One consequence of the free-wheeling nature of the IoT is that security is essentially up to the system designer of a thing, and as enterprises work to push out faster, cheaper things, sometimes at the expense of better, particularly with respect to security. Recent attention has been brought to attacks such as "Superfish," in which a "man-in-the-middle" (MITM) issued fake Google-branded Secure Socket Layer (SSL) certificates.

Another difficulty is that IoT devices may be constrained in terms of processing power, memory, storage and power. So they may not be capable of providing their own detailed security, such as deep packet inspection, reputation, network access control (NAC), and security information and event management (SIEM), data loss prevention, antivirus scanning, and anomaly detection for example, during real-time network operations.

Some existing and emerging network topologies are being constructed using more advanced security, such as datagram transport layer security (DTLS) and transport layer security (TLS) to realize end-to-end secure sessions that are independent of the network transport(s). So in some cases, IoT device traffic cannot be inspected by more powerful upstream monitoring appliances, such as gateways, firewalls, or other security appliances.

In some IoT network topologies, one or more trustworthy gateways or intermediary devices exist that could be employed as network security monitoring agents. But in some cases, this cannot be accomplished without an infrastructure for establishing shared keys for a trusted intermediary.

Embodiments of this specification provide methods for appropriately-equipped IoT devices to negotiate an upstream device to decrypt and inspect its network traffic, while still maintaining the overall security and confidentiality of the network connection to the device.

In an example, four actors are identified to illustrate the IoT network topology:

A first endpoint device (D1), which may be an IoT "thing" such as a data source.

A second (remote) endpoint device (D2).

An intermediary "sentinel" device (S1), which may provide offloaded security or other functions.

A key management device, such as a key distribution center (KDC1). Optionally, a second KDC may also be used when crossing domain boundaries where D1 and D2 are in separate administrative domains (a.k.a., IoT "realms"). The second KDC (KDC2) is a key management authority for a second realm (R2) while KDC1 is an authority for a first realm (R1).

In one example, a novel group key management model provides an end-to-end symmetric key exchange protocol, such as the Kerberos system, which may be used to establish a shared key between devices D1 and D2, but where an intermediary (S1) also participates. In an embodiment, an infrastructure such as draft-hardjono-ace-fluffy-oo may be used to generate "mini-tickets," and a request-response protocol with KDC1, wherein S1 is also permitted to receive the D1-D2 shared key.

For security implementation, certain aspects may be implemented within a trusted execution environment (TEE) to establish an attested and trusted connection to KDC1 such that the KDC can determine whether or not the configuration and capabilities of the endpoint device or sentinel device satisfies a domain security policy for trustworthy IoT operation. In the case of sentinel device S1 that is specifically responsible for performing network security scanning, deep packet inspection, reputation processing and SIEM, a policy may also require that it have a TEE at least as secure as the TEE on the endpoint device.

Once trust is established, the KDC can share symmetric keys with secured communication channels such as SSL, TLS, DTLS, or a message encryption technology such as JSON Web Encryption (JWE). Embodiments include sharing a symmetric key (K1) with S1 in addition to the respective endpoint devices D1 and D2.

In an example, the KDC secures the key (K1) in a TEE. S1 may also use a TEE to protect K1. The TEE may incorporate at least two network connections, (1) an "inside" connection between the S1 TEE and the inside device D1, and (2), a network connection within the TEE. The "outside" network connects the remote device D2 to network monitoring, packet processing and other security scanning, SIEM, and Network Access Control (NAC) functions, where such operations are applied from within a TEE environment. Thus, the risk of leaking the encryption keys (K1) or a compromise from malware attacks on the S1 device is minimized. This includes protection from specific attack scenarios such as SSL bump and unauthorized MITM.

A further embodiment extends the TEE into the IoT device so that the endpoints of communication are also hardened against attacks on the endpoint devices. For example, KDC1 established that endpoint devices D1 and D2 both possess a valid TEE upon processing a ticket request message. The TEE may then be used to establish a secure session context with which to exchange subsequent key management messages. The secure context establishes the trusted computing properties inherent in the endpoint devices D1 and D2.

In an embodiment, a second KDC (KDC2) operates within a second realm R2 where the endpoint device D2 is managed by a different domain authority than R1. In this situation, the domain authorities R1 and R2 may negotiate a trust policy such that keys issued through R2 to D2 are of an equivalent trust level to those issued by R1 to D1 and S1. In this scenario, R1 and R2 establish a Diffie-Hellman key agreement protocol that may attest or be attested by using a TEE-TEE attestation protocol such as the Sign-and-Mac (Sigma) protocol defined by Intel and by Internet Engineering Task Force (IETF) drafts. In particular, an asymmetric key that prevents MITM attackers from posing as a fake R2 may sign the sigma protocol messages. The private key is used to generate the signature and the public key is used to verify the signature. A security monitoring reputation, NAC and SIEM policy may be exchanged between R 1 and R2 to establish a security context in which the issuance of session keys may be common and mutually agreed upon.

A further embodiment allows for a second realm R2 to establish a security monitoring intermediary S2 whose aim is to apply a security policy aimed at protecting realm R2 according to a policy established by a trusted key management and security policy management device KDC2.

In yet another embodiment, the KDC function is combined with an endpoint device D1, resources and computation power permitting. In that case, device D1 may implement the functions described for the KDC.

Advantageously, this specification provides for a trusted key management and security policy management device (KDC1) to establish a shared symmetric key across multiple devices participating in a secure communication that is monitored by one or more trusted intermediaries that are vetted by KDC1 according to a trusted computing policy and an attestation exchange.

Further advantageously, embodiments establish a common realm-realm security policy and key management protocol whereby different realms R1 and R2 may dynamically agree upon a policy and protocol that allows a device D2 in R2 to interact with a device D1 in R1 following an agreed upon policy.

Further advantageously, embodiments establish an IoT intermediary or proxy service that may apply any suitable security function, such as monitoring, reputation, NAC, or SIEM by way of non-limiting example. This may otherwise be difficult in certain IoT architectures, as power constraints and rapid time-to-market requirements may otherwise preclude such exotic functions.

Embodiments also establish a system where endpoint devices (D1, D2) and an upstream device (S1) may apply security monitoring that is "accelerated" from the perspective of devices D1 and D2.

Embodiments also establish a mutually cooperative security and privacy policy that is common among a single realm R1 or across multiple realms R2, R3 . . . Rn, using a KDC representative from each realm.

There is also provided a system of KDCs that establish provably secure operations using attestation by participant devices (e.g., D1, D2, S1) involving both hardware and software isolated execution and data protection using a TEE, such as Intel SGX and other techniques.

Advantageously, after a symmetric key exchange between D1, D2 and S1, the system is prepared to apply security scanning and operational integrity functions by S1 to achieve the intended security benefits while removing the threat of a MITM attack by a rogue party masquerading as an S1 device.

A system and method for providing a sentinel appliance in an IoT realm will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network level diagram of a monitored network 100 according to one or more examples of the present specification. Monitored network 100 illustrates an example application in which the IoT provides inputs from a plurality of data sources, which are aggregated by a data aggregator. An expert system may then make decisions to drive a controlled system.

In this example, monitored network 100 includes a plurality of data sources 120 connected to a network 170. Also connected to network 170 is a data aggregator 110, communicatively coupled to an expert system 130, controlling controlled systems 140. Controlled systems 140 provide feedback 142 to data aggregator 110.

In one or more examples, data sources 120-1 through 120-N are disclosed. This is to illustrate that the number of data sources 120 may be large and indefinite, and may be in constant fluctuation as new data sources 120 are added to and removed from monitored network 100. Management of data sources 120 may be complicated both by the large number of data sources 120, and by the dynamic nature of monitored network 100. Thus in certain embodiments, it may be impractical for a human administrator to monitor and administer all of the various data sources 120. Furthermore, data sources 120 may not be statically located on network 170. For example, many cars carry data collection devices, and may provide data to network 170 as they hop from node to node on a mobile network. Thus, it may not be practical to predict in advance from which direction data will be coming, or what the nature of the data may be.

By way of further complication, a plurality of data sources 120 may provide data features of similar or identical types, but in slightly different formats. In one example, each data source 120 is configured to provide a data stream accompanied by a metadata packet identifying the type and source of data. However, there may be no globally enforced or enforceable standard for such metadata packets. In one example, data sources 120 may at least standardize on a delivery format for the metadata, such as XML or a similar standards-compliant data format. In that case, the metadata may have a number of identifiable field names, from which the feature type and source may be inferred. It should also be noted that in some cases data sources 120 may provide features of a compatible type, but in different formats. An example of this is a temperature feature provided by one data source 120-1 in Fahrenheit, and a second feature provided by a second data source 120-2 in Celsius. Similar issues may be encountered in any case where two or more data sources deliver similar features, with one data source providing the feature in metric units and the other data source providing the feature in Imperial or U.S. Customary units.

This large collection of features of disparate types from different sources, and in different formats, is delivered via network 170 to a data aggregator 110. Data aggregator 110 collects the many features, and in one example attempts to classify the features according to a useful taxonomy. In one case, data aggregator 110 defines a taxonomy having an arbitrary number of classification levels, such as classes, sub-classes, genera, and species. For example, the class of environmental data may include the subclass of temperature, which may include further species of temperatures by location or source. In one example, all environmental features are classified as environmental features, temperature features are classified as temperature features, and temperature features of a common species may be aggregated by data aggregator 110 as being species that may be usefully combined. Data aggregator 110 may then provide one or more outputs to expert system 130.

Expert system 130 may include one or more devices operable to collect features and to control one or more controlled systems 140. Expert system 130 may make decisions based on lookup tables, computer models, algorithms, or machine learning techniques. Features provided by data aggregator 110 may provide key inputs into the decisions that expert system 130 must make.

Controlled systems 140 may include a number of real-world systems, such as air-conditioning, environmental systems, security systems, traffic systems, space-based systems, and any other system subject to automated control or data-driven operation. Controlled system 140 may include in certain embodiments facilities to measure the response of controlled systems 140 to inputs from expert system 130. Controlled systems 140 may then provide feedback 142 to data aggregator 110. This may allow data aggregator 110 to measure the effect of combining or cross correlating certain features. In cases where data aggregator 110 determines that combining or cross correlating certain features has minimal impact on controlled systems 140, or in some cases even negative impact on controlled systems 140, data aggregator 110 may elect to unmerge certain features that are not found to be usefully combined.

In an example, each data source 120 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. Embedded devices and dedicated appliances may run real-time operating systems such as real-time Linux, QNX, VxWorks, or FreeRTOS. For embedded devices without real-time demands, minimal Linux-based operating systems are currently very popular. However, all of the foregoing examples are intended to be nonlimiting.

Network 170 may be any suitable network or combination of one or more networks operating on one or more suitable networking protocols, including for example, a local area network, an intranet, a virtual network, a wide area network, a wireless network, a cellular network, Bluetooth connections, or the Internet (optionally accessed via a proxy, virtual machine, or other similar security mechanism) by way of nonlimiting example. Importantly, network 170 need not be an IP-based network, but is broadly intended to encompass any suitable interconnect that allows devices to communicate with one another. This could include direct serial or parallel connections, Bluetooth, infrared communications, packet radio, telephony, or any other suitable communication link.

Certain functions may also be provided on one or more servers, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agent-ful and agentless VMs.

In certain examples, monitored network 100 (or suitable portions thereof) may form an IoT "realm" or "domain," or may be part of a larger realm or domain.

Figure 2:
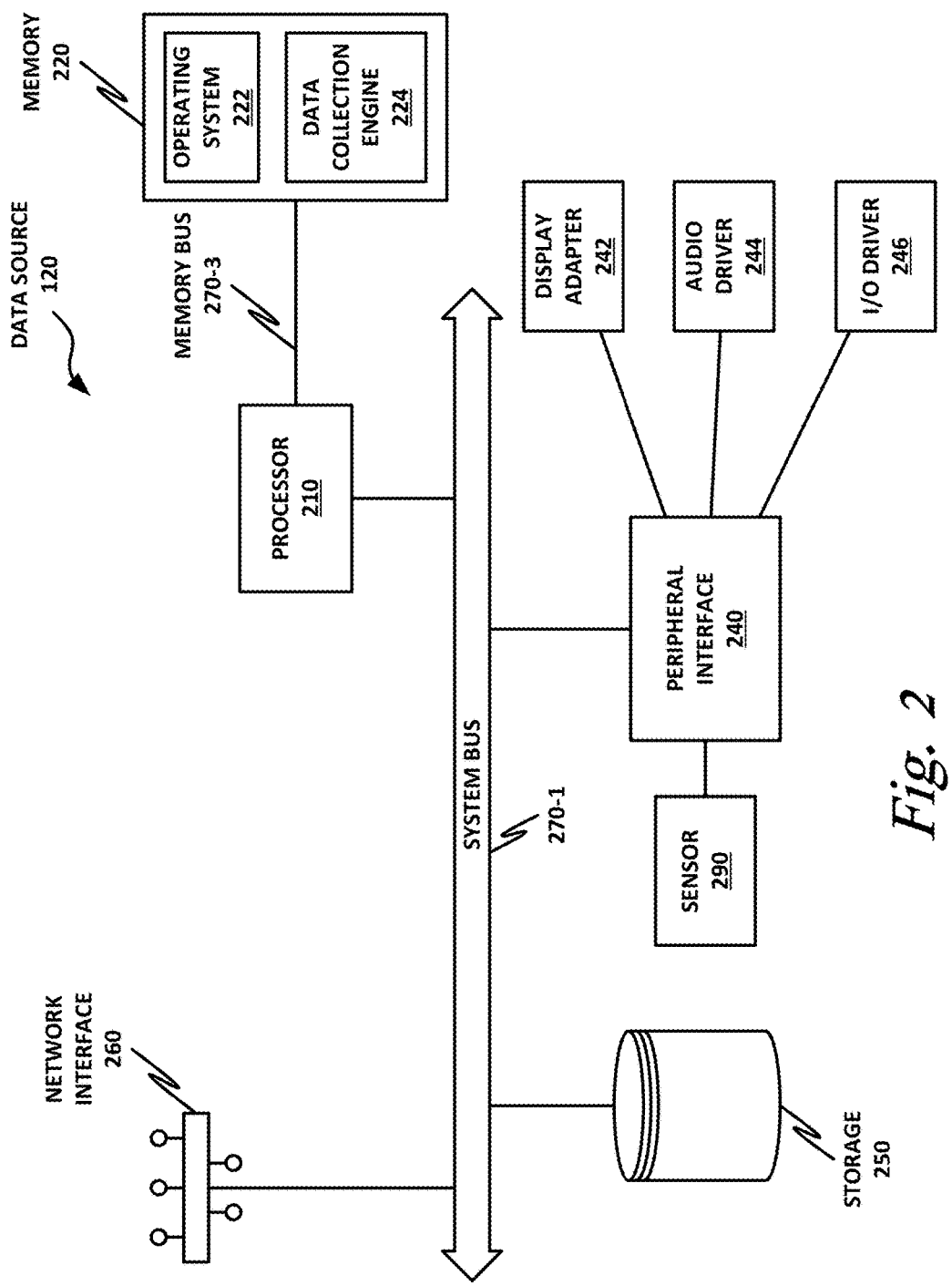
FIG. 2 is a block diagram of a data source according to one or more examples of the present specification.

FIG. 2 is a block diagram of data source 120 according to one or more examples of the present specification. Data source 120 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

Data source 120 includes a processor 210 connected to a memory 220, having stored therein executable instructions for providing an operating system 222 and at least software portions of a data collection engine 224. Other components of data source 120 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of data collection engine 224. Many other configurations are also possible, and are intended to be encompassed within the broad scope of this specification.

Network interface 260 may be provided to communicatively couple data source 120 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could be used to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, direct parallel or serial connection, packet radio, or any other appropriate architecture or system that facilitates communications in a network or telephonic environment.

Data collection engine 224, in one example, is operable to carry out computer-implemented methods as described in this specification. Data collection engine 224 may include one or more tangible non-transitory computer-readable mediums having stored thereon executable instructions operable to instruct a processor to provide a data collection engine 224. As used throughout this specification, an "engine" includes any combination of one or more logic elements, of similar or dissimilar species, operable for and configured to perform one or more methods provided by the engine. Thus, data collection engine 224 may comprise one or more logic elements configured to provide methods as disclosed in this specification. In some cases, data collection engine 224 may include a special integrated circuit designed to carry out a method or a part thereof, and may also include software instructions operable to instruct a processor to perform the method. In some cases, data collection engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that data collection engine 224 may also include other hardware and software, including configuration files, registry entries, and interactive or user-mode software by way of non-limiting example.

In one example, data collection engine 224 includes executable instructions stored on a non-transitory medium operable to perform a method according to this specification. At an appropriate time, such as upon booting data source 120 or upon a command from operating system 222 or a user, processor 210 may retrieve a copy of the instructions from storage 250 and load it into memory 220. Processor 210 may then iteratively execute the instructions of data collection engine 224 to provide the desired method.

Peripheral interface 240 may be configured to interface with any auxiliary device that connects to data source 120 but that is not necessarily a part of the core architecture of data source 120. A peripheral may be operable to provide extended functionality to data source 120, and may or may not be wholly dependent on data source 120. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

In an example, peripherals include one or more sensors 290, which may be configured and operable to collect data about real-world phenomena and to process the data into a digital form. In one operative example, data collection engine 224 collects data from sensor 290 via peripheral interface 240. The collected data may then be stored in storage 250 and/or sent over network interface 260.

Figure 3:
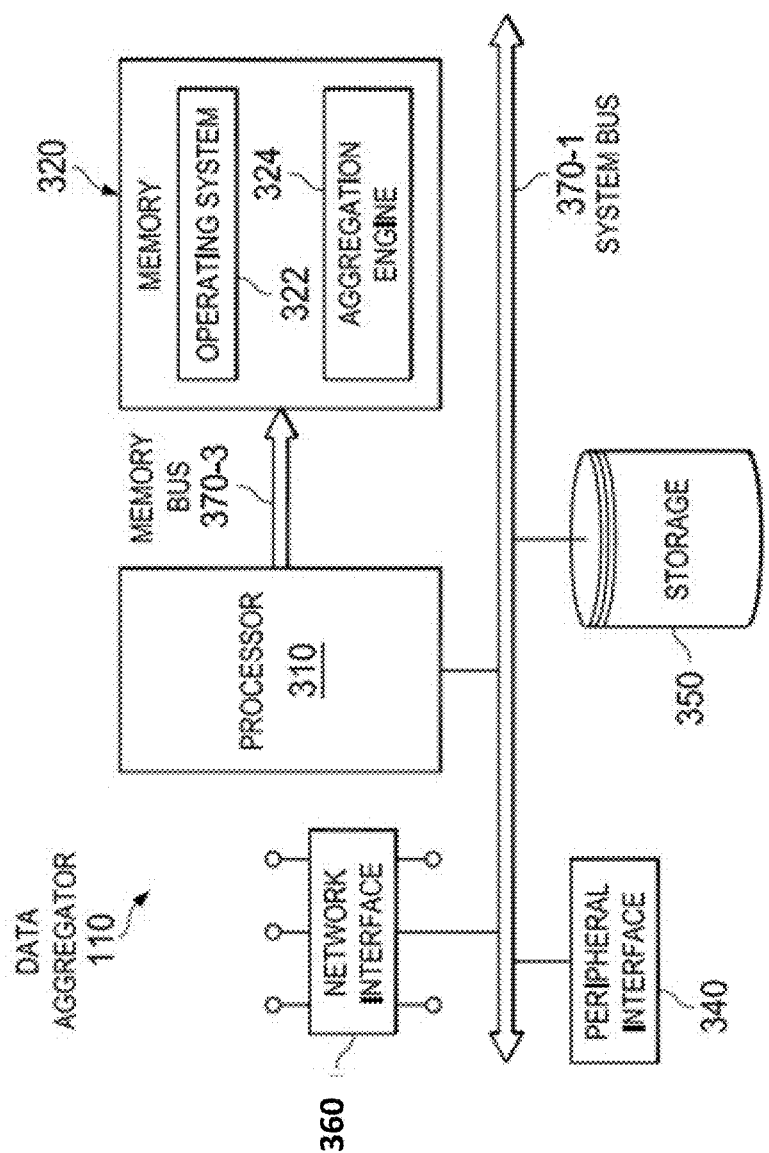
FIG. 3 is a block diagram of a data aggregator according to one or more examples of the present specification.

FIG. 3 is a block diagram of a data aggregator 110 according to one or more examples of the present specification. Data aggregator 110 may be any suitable computing device, as described in connection with FIG. 2. In general, the definitions and examples of FIG. 2 may be considered as equally applicable to FIG. 3, unless specifically stated otherwise.

Data aggregator 110 includes a processor 310 connected to a memory 320, having stored therein executable instructions for providing an operating system 322 and at least software portions of an aggregation engine 324. Other components of data aggregator 110 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of aggregation engine 324.

Network interface 360 may be provided to communicatively couple data aggregator 110 to a wired or wireless network, and may include one or more logic elements as described in FIG. 2.

Aggregation engine 324 is an engine as described in FIG. 2 and, in one example, includes one or more logic elements operable to carry out computer-implemented methods as described in this specification. Software portions of aggregation engine 324 may run as a daemon process.

Aggregation engine 324 may include one or more non-transitory computer-readable mediums having stored thereon executable instructions operable to instruct a processor to provide a security engine. At an appropriate time, such as upon booting data aggregator 110 or upon a command from operating system 322 or a user or security administrator, processor 310 may retrieve a copy of aggregation engine 324 (or software portions thereof) from storage 350 and load it into memory 320. Processor 310 may then iteratively execute the instructions of aggregation engine 324 to provide the desired method. Operationally, aggregation engine 324 may be configured to collect and classify data provided by data sources 120.

Peripheral interface 340 may be configured to interface with any auxiliary device that connects to data aggregator 110 but that is not necessarily a part of the core architecture of data aggregator 110. Peripherals may include, by way of non-limiting examples, any of the peripherals disclosed in FIG. 2. In some cases, data aggregator 110 may include fewer peripherals than data source 120, reflecting that it may be more focused on providing processing services rather than interfacing directly with users.

Figure 4:
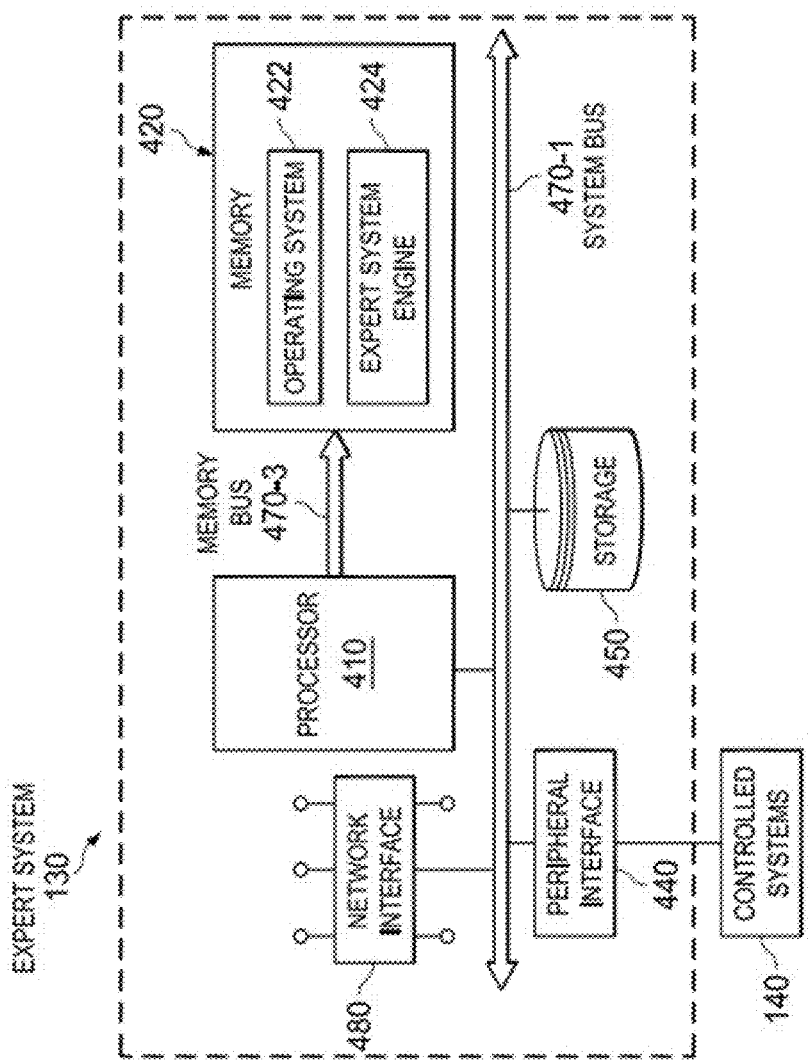
FIG. 4 is a block diagram of an expert system according to one or more examples of the present specification.

FIG. 4 is a block diagram of an expert system 130 according to one or more examples of the present specification. Expert system 130 may be any suitable computing device, as described in connection with FIG. 2. In general, the definitions and examples of FIG. 2 may be considered as equally applicable to FIG. 4, unless specifically stated otherwise.

Expert system 130 includes a processor 410 connected to a memory 420, having stored therein executable instructions for providing an operating system 422 and at least software portions of an expert system engine 424. Other components of expert system 130 include a storage 450, network interface 480, and peripheral interface 440. As described in FIG. 2, each logical block may be provided by one or more similar or dissimilar logic elements.

In an example, processor 410 is communicatively coupled to memory 420 via memory bus 470-3, which may be for example a direct memory access (DMA) bus. Processor 410 may be communicatively coupled to other devices via a system bus 470-1.

Processor 410 may be connected to memory 420 in a DMA configuration via DMA bus 470-3, or via any other suitable memory configuration. As discussed in FIG. 2, memory 420 may include one or more logic elements of any suitable type.

Storage 450 may be any species of memory 420, or may be a separate device, as described in connection with storage 250 of FIG. 2. Storage 450 may be, or may include therein, a database or databases or data stored in other configurations, and may include a stored copy of operational software such as operating system 422 and software portions of expert system engine 424.

Network interface 480 may be provided to communicatively couple expert system 130 to a wired or wireless network, and may include one or more logic elements as described in FIG. 2.

Expert system engine 424 is an engine as described in FIG. 2 and, in one example, includes one or more logic elements operable to carry out computer-implemented methods as described in this specification. Software portions of expert system engine 424 may run as a daemon process.

Expert system engine 424 may include one or more non-transitory computer-readable mediums having stored thereon executable instructions operable to instruct a processor to provide a security engine. At an appropriate time, such as upon booting expert system 130 or upon a command from operating system 422 or a user or security administrator, processor 410 may retrieve a copy of expert system engine 424 (or software portions thereof) from storage 450 and load it into memory 420. Processor 410 may then iteratively execute the instructions of expert system engine 424 to provide the desired method. Operationally, expert system engine 424 may be configured to receive aggregated data from data aggregator 110 and to make decisions about how to control controlled system 140.

Peripheral interface 440 may be configured to interface with any auxiliary device that connects to expert system 130 but that is not necessarily a part of the core architecture of expert system 130. Peripherals may include, by way of non-limiting examples, any of the peripherals disclosed in FIG. 2. In some cases, expert system 130 may include fewer peripherals than data source 120, reflecting that it may be more focused on providing processing services rather than interfacing directly with users.

Figure 5:
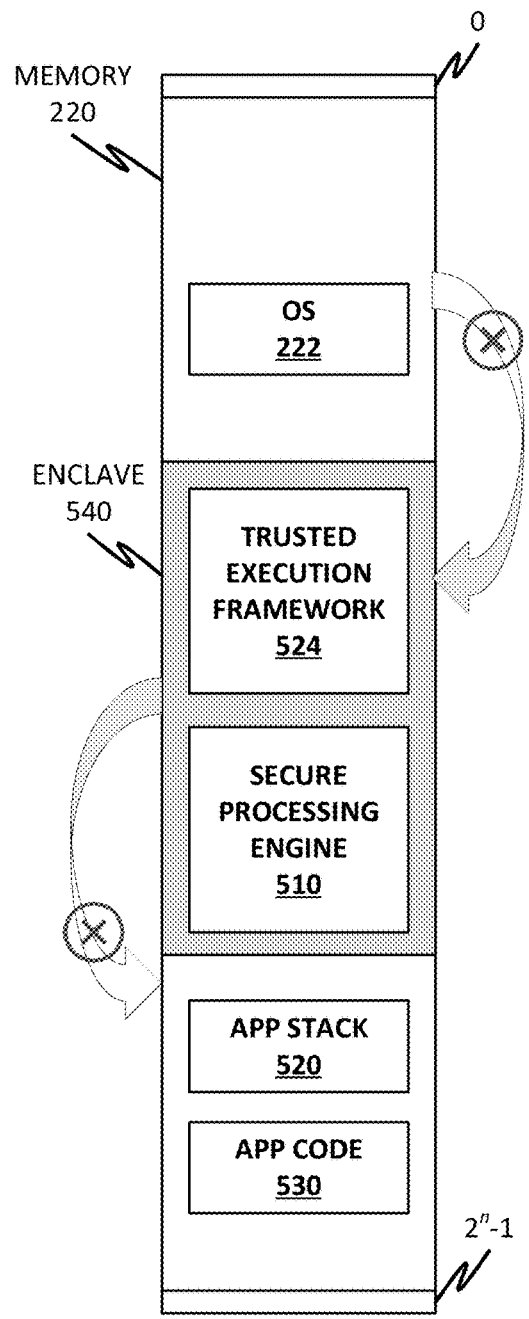
FIG. 5 is a block diagram of a trusted execution environment according to one or more examples of the present specification.

FIG. 5 is a block diagram of a trusted execution environment (TEE) 500 according to one or more examples of the present specification.

In the example of FIG. 5, memory 220 is addressable by n-bits, ranging in address from 0 to $2^n-1$. Within memory 220 are an OS 222, enclave 540, application stack 520, and application code 530.

In this example, enclave 540 is a specially-designated portion of memory 220 that cannot be entered into or exited from except via special instructions, such as Intel® SGX or similar. Enclave 540 is provided as an example of a secure environment which, in conjunction with a secure processing engine 510, forms a trusted execution environment (TEE) computing device 200. A TEE 3500 is a combination of hardware, software, and/or memory allocation that provides the ability to securely execute instructions without interference from outside processes, in a verifiable way. By way of example, TEE 3500 may include memory enclave 540 or some other protected memory area, and a secure processing engine 510, which includes hardware, software, and instructions for accessing and operating on enclave 540. Nonlimiting examples of solutions that either are or that can provide a TEE include Intel® SGX, ARM TrustZone, AMD Platform Security Processor, Kinibi, securiTEE, OP-TEE, TLK, T6, Open TEE, and SierraTEE, CSE, VT-x, MemCore, Canary Island, Docker, and Smack. Thus, it should be noted that in an example, secure processing engine 510 may be a user-mode application that operates via a trusted execution framework 524 within enclave 540. TEF 524 may be a framework or set of APIs that provide methods, classes, and wrappers that ease a programmer's access to TEE 500. TEE 500 may also conceptually include processor instructions that secure processing engine 510 and trusted execution framework 524 require to operate within enclave 540.

Secure processing engine 510 and trusted execution framework 524 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 222 may be excluded from TCB, in addition to the regular application stack 520 and application code 530.

In certain systems, computing devices equipped with the Intel Software Guard Extension (SGX) or equivalent instructions may be capable of providing an enclave 540. It should be noted however, that many other examples of TEEs are available, and TEE 500 is provided only as one example thereof. Other secure environments may include, by way of nonlimiting example, a virtual machine, sandbox, testbed, test machine, or other similar device or method for providing a TEE 500.

In an example, enclave 540 provides a protected memory area that cannot be accessed or manipulated by ordinary computer instructions. Enclave 540 is described with particular reference to an Intel® SGX enclave by way of example, but it is intended that enclave 540 encompass any secure processing area with suitable properties, regardless of whether it is called an "enclave."

One feature of an enclave is that once an enclave region 540 of memory 220 is defined, as illustrated, a program pointer cannot enter or exit enclave 540 without the use of special enclave instructions or directives, such as those provided by Intel® SGX architecture. For example, SGX processors provide the ENCLU[EENTER], ENCLU[ERESUME], and ENCLU[EEXIT]. These are the only instructions that may legitimately enter into or exit from enclave 540.

Thus, once enclave 540 is defined in memory 220, a program executing within enclave 540 may be safely verified to not operate outside of its bounds. This security feature means that secure processing engine 510 is verifiably local to enclave 540. Thus, when an untrusted packet provides its content to be rendered with secure processing engine 510 of enclave 540, the result of the rendering is verified as secure.

Enclave 540 may also digitally sign its output, which provides a verifiable means of ensuring that content has not been tampered with or modified since being rendered by secure processing engine 510. A digital signature provided by enclave 540 is unique to enclave 540 and is unique to the hardware of the device hosting enclave 540.

Figure 6:
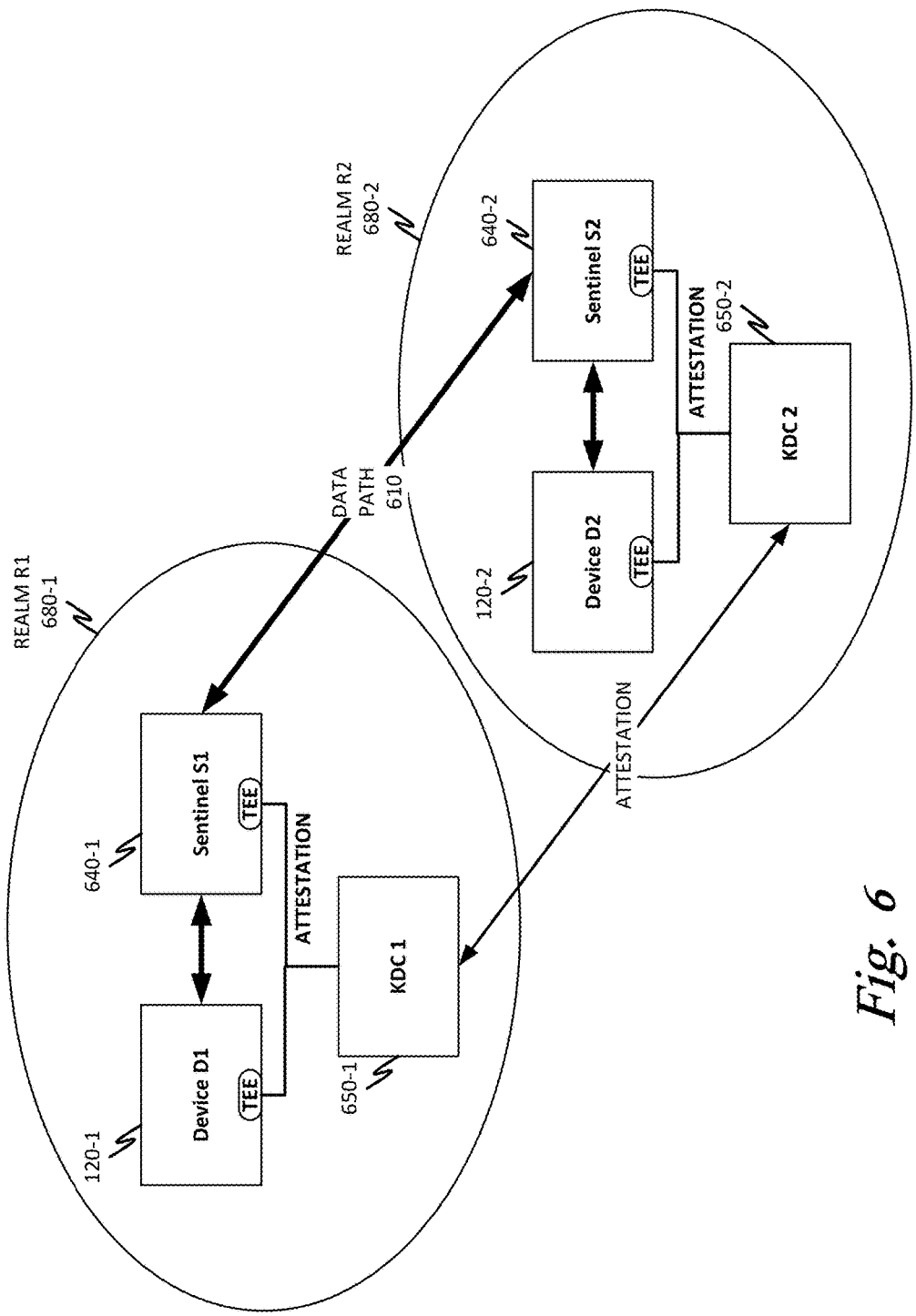
FIG. 6 is a block diagram of an internet of things according to one or more examples of the present specification.

FIG. 6 is a block diagram of an IoT network according to one or more examples of the present specification. In this example, a realm R1 680-1 communicates with a realm R2 680-2. As used herein, a "realm" includes a domain of interpretation for security policies, monitoring, and key management. Realm R1 includes one or more devices 120-1, which in an example each have a TEE 500. A sentinel device S1 640-1 may be configured to perform a service appliance function, such as a security function, and also includes a TEE 500. A key distribution center KDC1 650-1 provides security functionality and key management.

In this example, D1 120-1 needs to communicate with D2 120-2. D2 120-2 resides in a different realm, R2 680-2. R2 680-2 similarly includes a sentinel S2 640-2, and a KDC2 650-2.

KDC1 650-1 and KDC2 650-2 may be configured to communicate with one another as necessary, for example to perform attestation and dynamic inter-realm security policy and key management.

In this example, the communication path between D1 and D2 follows the form D1<->S1<->S2<->D2.

In an example, realms R1 680-1 and R2 680-2 may cooperate to agree upon a security monitoring policy applied by S1 and S2 respectively. A key management function allows KDC1 650-1 and KDC2 650-2 to issue shared symmetric keys to each of a plurality of participating devices (D1, D2, and possibly others) and sentinels (S1, S2, and possibly others) such that an end-to-end encryption scheme may be intermediated by trusted intermediaries that are identifiable and distinguished from untrusted intermediaries otherwise known as MITM attackers.

KDC2 650-2 attests a trusted execution environment (TEE) of the sentinels (S1, S2) before extending or otherwise delegating the monitoring functions. This may ensure, for example, that the security features of the sentinels are at least as secure as the security features of the devices (D1, D2), or that they otherwise meet minimum security requirements for the network. Security monitoring functions may include deep packet inspection, network and session monitoring, reputation processing, security incident event management (SIEM), and network access control (NAC) by way of nonlimiting example.

In an example, KDC 1 650-1 may negotiate with KDC2 650-2 to establish a cross-domain security monitoring and key management policy where a symmetric key shared with local device D1 120-2 and local sentinel S1 640-1 may also be shared with a remote device D2 120-2 and a remote sentinel S2 640-2. The sharing of keys is conditioned on an expectation that the shared key (K1) is protected and otherwise not misused. A trusted execution environment (TEE) is used by both S1 640-1 and S2 640-2 to establish a basis for trustworthy operation of the security processing functions.

An attestation protocol such as Sigma may be used by sentinels 640 and devices 120 to prove the existence of a hardened environment, including a TEE that can be used to protect shared keys and to perform security monitoring functions.

The configuration and topology of sentinels within a realm need not be restricted to a single physical device performing all security operations, but may be distributed across a plurality of devices each performing a subset of possible security monitoring, reputation, deep packet inspections, NAC, SIEM, or other functions. Each shares key K1 to perform encryption and re-encryption as needed to perform its respective function.

A device or sentinel with sufficient security protections and trust may be deemed by a realm owner to be satisfactory such that the KDC function may be hosted by that device. Thus, in some embodiments, the respective roles of "device," "sentinel," and "KDC" may be combined in a single device, each function may be provided by a separate device, or functions may be distributed across multiple devices according to the physical and logical constraints of the system.

Figure 7:
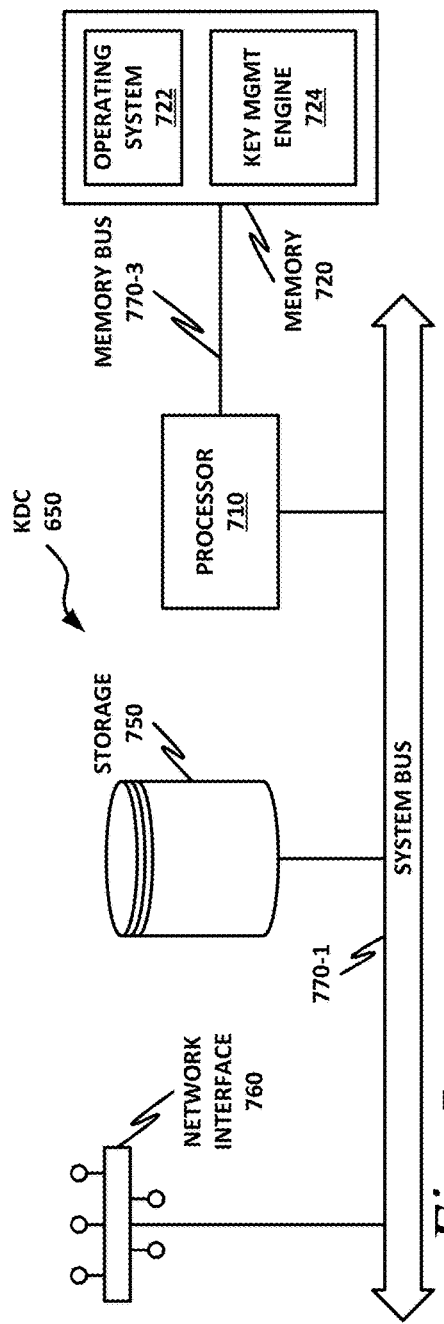
FIG. 7 is a block diagram of a KDC according to one or more examples of the present specification.

FIG. 7 is a block diagram of a KDC 650 according to one or more examples of the present specification.

KDC 650 may be any suitable computing device, as described in connection with FIG. 2. In general, the definitions and examples of FIG. 2 may be considered as equally applicable to FIG. 7, unless specifically stated otherwise.

KDC 650 includes a processor 710 connected to a memory 720, having stored therein executable instructions for providing an operating system 722 and at least software portions of an key management engine 724. Other components of KDC 650 include a storage 750, network interface 760. As described in FIG. 2, each logical block may be provided by one or more similar or dissimilar logic elements.

In an example, processor 710 is communicatively coupled to memory 720 via memory bus 770-3, which may be for example a direct memory access (DMA) bus. Processor 710 may be communicatively coupled to other devices via a system bus 770-1.

Processor 710 may be connected to memory 720 in a DMA configuration via DMA bus 770-3, or via any other suitable memory configuration. As discussed in FIG. 2, memory 720 may include one or more logic elements of any suitable type.

Storage 750 may be any species of memory 720, or may be a separate device, as described in connection with storage 250 of FIG. 2. Storage 750 may be, or may include therein, a database or databases or data stored in other configurations, and may include a stored copy of operational software such as operating system 722 and software portions of key management engine 724.

Network interface 760 may be provided to communicatively couple KDC 650 to a wired or wireless network, and may include one or more logic elements as described in FIG. 2.

Key management engine 724 is an engine as described in FIG. 2 and, in one example, includes one or more logic elements operable to carry out computer-implemented methods as described in this specification. Software portions of key management engine 724 may run as a daemon process.

Key management engine 724 may include one or more non-transitory computer-readable mediums having stored thereon executable instructions operable to instruct a processor to provide a security engine. At an appropriate time, such as upon booting KDC 650 or upon a command from operating system 722 or a user or security administrator, processor 710 may retrieve a copy of key management engine 724 (or software portions thereof) from storage 750 and load it into memory 720. Processor 710 may then iteratively execute the instructions of key management engine 724 to provide the desired method. Operationally, key management engine 724 may be configured to receive aggregated data from data aggregator 110 and to make decisions about how to control controlled system 140.

Figure 8:
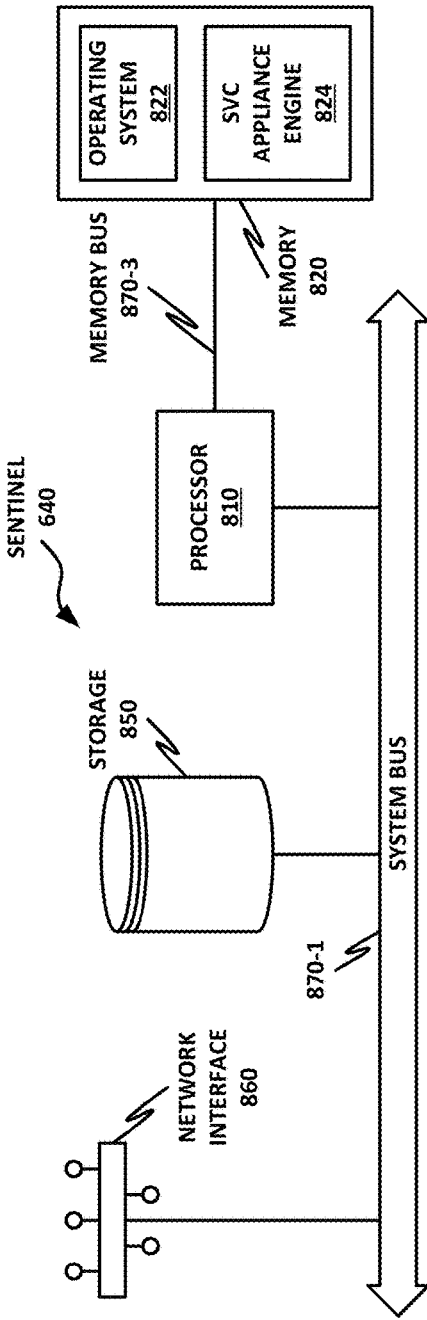
FIG. 8 is a block diagram of a sentinel device according to one or more examples of the present specification.

FIG. 8 is a block diagram of a sentinel device 640 according to one or more examples of the present specification. Expert system 130 may be any suitable computing device, as described in connection with FIG. 2. In general, the definitions and examples of FIG. 2 may be considered as equally applicable to FIG. 8, unless specifically stated otherwise.

Expert system 130 includes a processor 810 connected to a memory 820, having stored therein executable instructions for providing an operating system 822 and at least software portions of a service appliance engine 824. Other components of sentinel 640 include a storage 850, network interface 860. As described in FIG. 2, each logical block may be provided by one or more similar or dissimilar logic elements.

In an example, processor 810 is communicatively coupled to memory 820 via memory bus 870-3, which may be for example a direct memory access (DMA) bus. Processor 810 may be communicatively coupled to other devices via a system bus 870-1.

Processor 810 may be connected to memory 820 in a DMA configuration via DMA bus 870-3, or via any other suitable memory configuration. As discussed in FIG. 2, memory 820 may include one or more logic elements of any suitable type.

Storage 850 may be any species of memory 820, or may be a separate device, as described in connection with storage 250 of FIG. 2. Storage 850 may be, or may include therein, a database or databases or data stored in other configurations, and may include a stored copy of operational software such as operating system 822 and software portions of service appliance engine 824.

Network interface 860 may be provided to communicatively couple sentinel 640 to a wired or wireless network, and may include one or more logic elements as described in FIG. 2.

Service appliance engine 824 is an engine as described in FIG. 2 and, in one example, includes one or more logic elements operable to carry out computer-implemented methods as described in this specification. Software portions of service appliance engine 824 may run as a daemon process.

Service appliance engine 824 may include one or more non-transitory computer-readable mediums having stored thereon executable instructions operable to instruct a processor to provide a security engine. At an appropriate time, such as upon booting sentinel 640 or upon a command from operating system 822 or a user or security administrator, processor 810 may retrieve a copy of service appliance engine 824 (or software portions thereof) from storage 850 and load it into memory 820. Processor 810 may then iteratively execute the instructions of service appliance engine 824 to provide the desired method. Operationally, service appliance engine 824 may be configured to receive aggregated data from data aggregator 110 and to make decisions about how to control controlled system 140.

Figure 9:
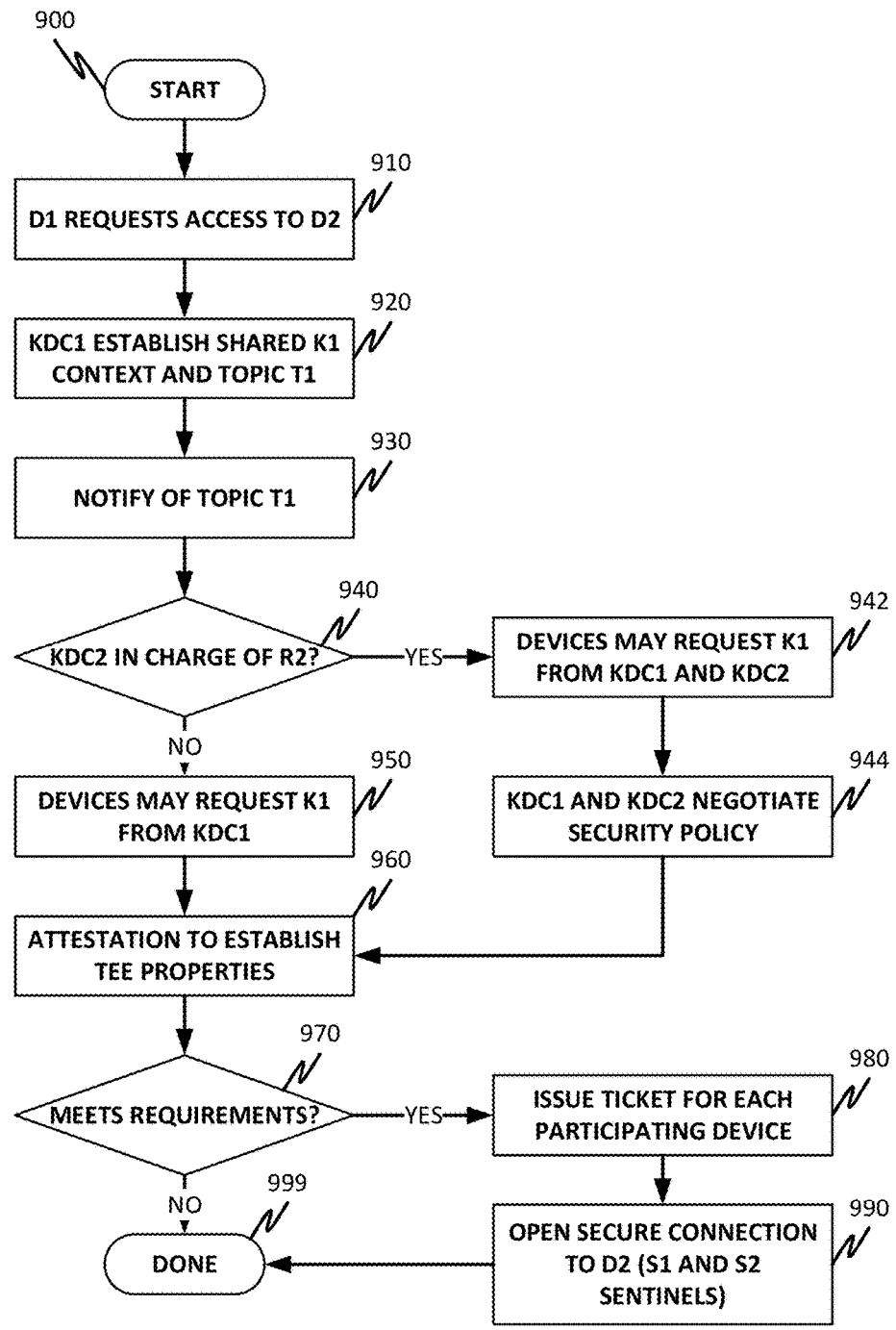
FIG. 9 is a flow chart of a method according to one or more examples of the present specification.

FIG. 9 is a flow chart of a method 900 according to one or more examples of the present specification. In an example, method 900 establishes the suitability of each participant in a secure transaction, monitored in an end-to-end session between IoT devices D1 and D2, where one or more sentinels spanning one or more administrative realms have domain specific security policies that are managed by respective KDCs.

Starting in block 900, in block 910, D1 requests access to D2 using KDC1.

In block 920, KDC1 establishes a shared session key K1 context. A topic Ti may also be assigned to the context.

In block 930, KDC1 (or any other suitable network broker) notifies S1, D2, and optionally S2, and KDC2 of the topic Ti, by which D1 and D2 may securely interact.

Decision block 940 checks whether KDC2 is in charge of the second realm R2. If yes, then in block 942, each of D1 and S1 may request the topic key K1 from KDC1 and D2. S2 may request it from KDC2.

In block 944, KDC2 connects with KDC1 to negotiate a common security policy for interactions between D1 and D2. Control then passes to block 960.

Returning to block 940, if KDC2 is not in charge of a second realm R2, then in block 950, each of D1, D2, S1, and S2 may request the topic key K1 from KDC1.

In block 960, KDC1 or KDC2 may attest D1, S1, and D2, S2 respectively to establish the TEE properties of each.

In decision block 970, KDC1 and KDC2 may check whether the TEE and other security capabilities of each device match the minimum security requirements, as determined by policy. If not, then the sentinels may not be used within the data flow, and in block 999 the method is done.

On the other hand, if the devices meet the minimum security requirements, then in block 980, the appropriate KDC may issue a "mini ticket" or other encrypted response over K1 for each participant device (D1, S1, D2, S2).

In block 990, D1 opens a secure connection to D2 with S1 and S2 as intermediary sentinels. Data may then be exchanged as necessary.

In block 999, the method is done.

After this method is complete, sentinel S1 has shared the key K1 that allows access to the plaintext traffic within a TEE such that security processes can mitigate malware, protect against protocol exploits, perform traffic analysis, reputation, NAC, and SIEM, provide data leakage protection (monitoring for exposure of sensitive data), or any other suitable security service, within the context of an end-to-end data exchange.

As inspections are completed inside a TEE, this prevents exposure of keys and data to unauthorized or untrusted devices and intermediaries.

The KDC device can define the minimum security requirements for participant devices. For example the KDC device can establish trust in a subset of sentinel devices such as those having secure boot or trusted update capability and where a TEE is operating.

With symmetric key cyphers, sentinel devices may be able to inspect both the incoming and outgoing traffic between devices D1 and D2 without D1 and D2 specifically being aware of or authenticating to any of the sentinel devices. This transparency is achieved using the KDC, which establishes a security context (topic) through which the collection of participants cooperate to achieve the security objective.

Use of asymmetric keys may also be allowed in cases where intermediaries should be explicitly authenticated. In such situations, the intermediary is issued an asymmetric certificate by a domain authority and the shared symmetric key K1 is signed by the certificate private key issued to the sending sentinel or device. The upstream device uses its realm trust anchor to verify the sender's certificate. The pre-shared key K1 may then be used to establish temporal keys for hop-hop data protection.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in one example, a computing apparatus, comprising: a trusted execution environment (TEE); and a security engine operable to: identify a key negotiation for an encrypted connection between a first device and a second device; request a service appliance key for the key negotiation; receive the service appliance key; and perform a service appliance function on traffic between the first device and the second device.

There is also disclosed an example, wherein the first device is in a first realm and the second device is in a second realm.

There is also disclosed an example, wherein the security engine further comprises logic to establish a connection between the first device and a sentinel device logically disposed between the computing apparatus and the second device.

There is also disclosed an example, wherein the security engine is operable to route traffic from the first device to the sentinel device.

There is also disclosed an example, wherein the security engine is operable to perform routing at an application layer.

There is also disclosed an example, wherein the security engine is operable to perform internet protocol routing.

There is also disclosed an example, wherein the computing apparatus further comprises a service appliance engine operable to perform a service appliance security monitoring function.

There is also disclosed an example, wherein the security monitoring function is selected from the group consisting of network monitoring, data loss prevention, packet processing, security scanning, antivirus, firewall, deep packet inspection, reputation services, security information and event monitoring, and network access control.

There is also disclosed an example, wherein the security engine is operable to establish a secure connection with the service appliance key.

There is also disclosed an example, wherein the service appliance key is different from a key for the encrypted connection between the first device and second device.

There is also disclosed an example, wherein the security engine is operable to receive a service appliance ticket comprising the service appliance key and a second key different from the service appliance key.

There is also disclosed an example, wherein the encrypted connection between the first device and the second device is encrypted within the TEE.

There is also disclosed in an example, a computing apparatus, comprising: a key store; and a key management engine, operable to: receive a negotiation between a first device and a second device; allocate a shared key for the negotiation; receive a service appliance key request from a sentinel device; issue a service appliance ticket to the sentinel device.

There is also disclosed an example, wherein the key management engine is further configured to perform an attestation of the security capability of a TEE of the sentinel device, comprising verifying that a trusted execution environment (TEE) of the sentinel device is at least as capable as a TEE of the first device.

There is further disclosed an example of one or more tangible, non-transitory computer-readable storage mediums having stored thereon executable instructions for instructing one or more processors for providing a security engine and/or key management engine operable for performing any or all of the operations of the preceding examples.

There is further disclosed an example of a method of providing a security engine and/or key management engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A sentinel device configured to provide Internet of things (IoT) security, comprising:
    a hardware platform;
    a trusted execution environment (TEE) to execute on the hardware platform; and
    a security engine to operate within the TEE and operable to:
        communicatively couple to a trusted gateway device via a first interface and communicatively couple to a second device via a second interface;
        receive a domain security policy for a domain of the second device;
        determine that the second device lacks at least some security features to satisfy the domain security policy;
        identify a key negotiation for an encrypted connection between the trusted gateway device and the second device;
        request a service appliance key for the key negotiation;
        receive the service appliance key; and
        perform a service appliance function on traffic between the trusted gateway and the second device, comprising providing security functions to satisfy at least some of the security features lacking in the second device.

2. The sentinel device of claim 1, wherein the trusted gateway device is in a first realm and the second device is in a second realm.

3. The sentinel device of claim 1, wherein the security engine is operable to route traffic from the trusted gateway device to the sentinel device.

4. The sentinel device of claim 3, wherein the security engine is operable to perform routing at an application layer.

5. The sentinel device of claim 3, wherein the security engine is operable to perform internet protocol routing.

6. The sentinel device of claim 1, wherein the sentinel device further comprises a service appliance engine operable to perform a service appliance security monitoring function.

7. The sentinel device of claim 6, wherein the service appliance security monitoring function is selected from the group consisting of network monitoring, data loss prevention, packet processing, security scanning, antivirus, firewall, deep packet inspection, reputation services, security information and event monitoring, network access control, and anomaly prevention.

8. The sentinel device of claim 1, wherein the security engine is operable to establish a secure connection with the service appliance key.

9. The sentinel device of claim 8, wherein the service appliance key is different from a key for the encrypted connection between the trusted gateway device and the second device.

10. The sentinel device of claim 1, wherein the security engine is operable to receive a service appliance ticket comprising the service appliance key and a second key different from the service appliance key.

11. The sentinel device of claim 1, wherein the encrypted connection between the trusted gateway device and the second device is encrypted within the TEE.

12. One or more tangible, non-transitory computer readable storage mediums having stored thereon executable instructions for providing a security engine to operate within a trusted execution environment (TEE), wherein the security engine is operable to:
    communicatively couple to a trusted gateway device via a first interface and communicatively couple to a second device via a second interface;
    receive a domain security policy for a domain of the second device;
    determine that the second device lacks at least some security features to satisfy the domain security policy;
    identify a key negotiation for an encrypted connection between the trusted gateway device and the second device;
    request a service appliance key for the key negotiation;
    receive the service appliance key; and
    perform a service appliance function on traffic between the trusted gateway device and the second device, comprising providing security functions to satisfy at least some of the security features lacking in the second device.

13. The one or more tangible, non-transitory computer readable mediums of claim 12, wherein the trusted gateway device is in a first realm and the second device is in a second realm.

14. The one or more tangible, non-transitory computer readable mediums of claim 12, wherein the security engine is operable to route traffic from the trusted gateway device to the second device.

15. The one or more tangible, non-transitory computer readable mediums of claim 14, wherein the security engine is operable to perform routing at an application layer.

16. The one or more tangible, non-transitory computer readable mediums of claim 14, wherein the security engine is operable to perform internet protocol routing.

17. The one or more tangible, non-transitory computer readable mediums of claim 12, wherein the instructions further provide for a service appliance engine operable to perform a service appliance security monitoring function.

18. The one or more tangible, non-transitory computer readable mediums of claim 17, wherein the service appliance security monitoring function is selected from the group consisting of network monitoring, data loss prevention, packet processing, security scanning, antivirus, firewall, deep packet inspection, reputation services, security information and event monitoring, network access control, and anomaly prevention.

19. The one or more tangible, non-transitory computer readable mediums of claim 12, wherein the security engine is operable to establish a secure connection with the service appliance key.

20. The one or more tangible, non-transitory computer readable mediums of claim 19, wherein the service appliance key is different from a key for the encrypted connection between the trusted gateway device and the second device.

21. The one or more tangible, non-transitory computer readable mediums of claim 12, wherein the encrypted connection between the trusted gateway device and the second device is encrypted within the TEE.

22. A computer-implemented method of providing Internet of things (IoT) security, comprising:
   providing a trusted execution environment (TEE) to execute on a hardware platform;
   within the TEE:
      communicatively coupling to a trusted gateway device via a first interface and communicatively coupling to a second device via a second interface;
      receiving a domain security policy for a domain of the second device;
      determining that the second device lacks at least some security features to satisfy the domain security policy;
      identifying a key negotiation for an encrypted connection between the trusted gateway device and the second device;
      requesting a service appliance key for the key negotiation;
      receiving the service appliance key; and
      performing a service appliance function on traffic between the trusted gateway and the second device, comprising providing security functions to satisfy at least some of the security features lacking in the second device.

23. The method of claim 22, wherein the trusted gateway device is in a first realm and the second device is in a second realm.

24. The method of claim 22, further comprising routing traffic from the trusted gateway device to a sentinel device.

25. The method of claim 22, further comprising providing routing at an application layer.

* * * * *